Patented Jan. 8, 1929.

1,697,929

UNITED STATES PATENT OFFICE.

LONNIE W. RYAN, OF NIAGARA FALLS, NEW YORK, ASSIGNOR TO TITANIUM PIGMENT COMPANY, INC., OF NEW YORK, N. Y., A CORPORATION OF MAINE.

ALKALI-METAL TITANATE AND METHOD OF MAKING SAME.

No Drawing. Application filed June 2, 1925. Serial No. 34,478.

My invention relates to titanium compounds and methods for their economical manufacture which compounds have varied uses in the industrial arts. My invention provides more particularly an improved and more economical method for converting hydrated titanium oxygen compounds as meta-titanic acid and titanium basic sulphate into a titanium compound having novel characteristics and properties, more particularly its ready solubility in organic and dilute mineral acids.

My invention is particularly useful in the manufacture of double salts of titanium and alkali-metal such as, for example, titanium sodium tartrate, titanium sodium lactate, titanium potassium oxalate, titanium sodium sulphate, etc. Such invention is likewise equally useful in the manufacture of mixed salts such as, for example, those of titanic, oxalic and tartaric acids; and of titanic, oxalic and lactic acids. These salts are of commercial importance and of great and extensive use in the arts, particularly in the leather and textile industries.

The ortho and meta-hydroxides of titanium, $Ti(OH)_4$ and $TiO(OH)_2$, sometimes called ortho and meta-titanic acids, respectively, are generally believed to exist. But there is reason to think that the molecules of these two hydrates of titanic oxide may be very complex and only approximate to the composition represented by these formulæ. The main distinguishing difference in behavior of the two is the solubility of the ortho form in strong organic acids and in dilute mineral acids, whereas the meta form is insoluble in these acids.

The ortho-titanic acid is obtained as a voluminous, white precipitate upon adding alkali metal or ammonium hydroxide or carbonate to a cold solution of titanium chloride, resulting, when dried and calcined, in very hard, horny and dense masses. The meta-titanic acid may be obtained by various methods; for example, by boiling an aqueous solution of titanic chloride.

The United States Rossi and Barton Patents Nos. 1,196,029, 1,196,030 and 1,196,031 issued August 29, 1916, disclose how a basic titanic sulphate can be precipitated by diluting a titanic sulphate solution with water and thereafter boiling same. Such basic sulphate so produced is not soluble in dilute mineral acids nor in strong organic acids.

The United States Jebsen Patent No. 1,361,867 of December 14, 1920, discloses a process whereby the $SO_3$ radical in such a titanium compound may be removed by treating with alkali metal hydroxide in amount sufficient to combine with all the sulphate radical present and thereafter washing with water.

One of the objects of my invention is, among other things, not to remove the $SO_3$ radical, but to form a product or compound which is readily soluble both in organic and in dilute mineral acids.

I have discovered that hydrated titanium oxygen compounds such as meta-titanic acid and titanium basic sulphate (the latter being really a form of meta-titanic acid carrying a small omount of $SO_3$), may, under certain conditions, be converted with a relatively small amount of caustic alkali or alkali metal carbonate at a temperature below the point of fusion into a novel product or compound that is soluble in organic and dilute mineral acids, only 50%, or even less, of the theoretical amount of caustic alkali for formation of the alkali metal meta-titanate ($M_2TiO_3$) being required in my improved methods, and the temperature need not exceed 150° C.

I am aware that it is known that meta titanic acid and titanium basic sulphate as well as certain ores of titanium such as rutile and ilmenite, may be rendered soluble in acids by heating to the point of fusion with a small amount of alkali. But such a process is carried out with the greatest difficulty owing chiefly to the corrosive action of molten alkali on furnace linings.

To accomplish such conversion according to my improved methods, I mix the titanium compound with a small amount of alkali metal hydroxide or carbonate and a small amount of water and heat to a comparatively low temperature. It will be observed that in my process I am able to eliminate the objections to the older well known fusion process. I use a small amount of the alkaline compound of an alkali metal and a temperature far below the point of fusion.

I have also found that the alkaline compounds of alkali metals used in making the hereinbefore mentioned conversion are, in the order of their effectiveness, as follows: potassium hydroxide, sodium hydroxide, potassium carbonate, sodium carbonate. The reaction goes most readily with potassium hydroxide and with the most difficulty with sodium carbonate.

Basic sulphates made by me have analyzed from 75% to 78% $TiO_2$, from 7% to 10% $SO_3$ and from 12% to 17% combined water. These analyses correspond closely to the empirical formula $$(TiO_2)_{10}.SO_3.10H_2O.$$

Such a formula represents 75.47% $TiO_2$, 7.55% $SO_3$ and 16.98% $H_2O$.

When converting such a titanium compound to a soluble product by using potassium hydroxide (KOH) for meta-titanate formation, I assume that the reaction goes as follows:

$$(TiO_2)_{10}.SO_3.10H_2O + 20KOH = \\ K_2SO_4 + K_2Ti_2O_5 + 8K_2TiO_3 + 20H_2O.$$

The theoretical ratio of the titanium oxide, $TiO_2$, contained in the basic sulphate.

$$(TiO_2)_{10}.SO_3.10H_2O$$

to potassium hydroxide KOH is 80 to 112.

The presence of the $SO_3$ radical causes the formation of one mole of $K_2SO_4$ and one mole of the acid titanate, $K_2Ti_2O_5$. If a sufficient excess of KOH is used to take care of the $SO_3$ radical, I assume that the reaction takes place as follows:

$$(TiO_2)_{10}.SO_3.10H_2O + 22KOH = \\ K_2SO_4 + 10K_2TiO_3 + 21H_2O.$$

If less than the theoretical amount of potassium hydroxide is used a part or all of the titanium probably goes to the form of acid titanates.

In converting metatitanic acid, which does not contain an acid radical such as $SO_3$, to a soluble product, I assume that the reaction goes as follows:

$$TiO(OH)_2 + 2KOH = K_2TiO_3 + 2H_2O$$

The theoretical ratio between the titanium oxide, $TiO_2$, contained in the metatitanic acid, $TiO(OH)_2$ and potassium hydroxide KOH is 80 to 112.

In all probability these reactions do not take place in exact accord with the equations but are only approximately represented by them.

When using potassium carbonate ($K_2CO_3$) for such conversion, the reactions between titanium basic sulphate and the potassium carbonate are approximated by the following equations:

$$(TiO_2)_{10}.SO_3.10H_2O + 11K_2CO_3 = \\ 10K_2TiO_3 + K_2SO_4 + 10H_2O + 11CO_2$$

and $$(TiO_2)_{10}.SO_3.10H_2O + 6K_2CO_3 = \\ 5K_2Ti_2O_5 + 10H_2O + 6CO_2 + K_2SO_4.$$

The reactions between metal titanic acid and potassium carbonate are approximated by the following equations:—

$$TiO(OH)_2 + K_2CO_3 = K_2TiO_3 + H_2O + CO_2$$

and $$2TiO(OH)_2 + K_2CO_3 = \\ K_2Ti_2O_5 + 2H_2O + CO_2.$$

The following are examples of how my invention can be carried into practical effect, but the invention is not to be confined to these examples.

*Example 1.*—Metatitanic acid or basic titanic sulphate prepared in any manner whatsoever, is made into a paste with water so that the $TiO_2$ content is about 30%. If the basic sulphate has been used, 1600 pounds of 90% potassium hydroxide is slowly added to 3300 pounds of the paste, containing about 1000 pounds of $TiO_2$, and the materials mixed by stirring with an agitator, by tumbling in a barrel or by any suitable method. The amount of potassium hydroxide used is equal to 1.6 times the weight of the titanium oxide contained in the basic sulphate or the metatitanic acid. This amount of KOH is theoretical for the conversion of all the titanium to the metatitanate and the $SO_3$ to $K_2SO_4$. I prefer using a shallow steel tank and stirring with a steel agitator as the potassium hydroxide is added. Heat is then applied for from 1 to 4 hours depending upon the temperature. I have found subjecting to a temperature of 100 to 200° C., ordinarily not exceeding 140° C. for from 2 to 3 hours to be a convenient, practical operation. It is not necessary to stir after the potassium compound has been thoroughly mixed in.

*Example 2.*—Moist meta-titanic acid or titanium basic sulphate containing about 1000 lbs. $TiO_2$ is mixed with 2000 lbs. of potassium carbonate. After thorough mixing the material is heated at a temperature of about 200° C. for from three to four hours. At the end of this time reaction has taken place, the final product being essentially $K_2TiO_3$ soluble in organic and dilute mineral acids and in mixtures of acids. It may then be dissolved in a similar manner as hereinafter described in Example 3.

The product formed in any case is an essentially white, minutely crystalline powder which is only slightly, if at all, hygroscopic. The specific gravity of the dry material ranges between 2.3 and 2.9 depending upon the proportion and kind of alkali used. There is no difference in the products made from the basic sulphate and the hydroxide (metatitanic acid), except that that made from the basic sulphate contains a small amount of alkali sulphate. The composition is represented by the formula $K_2TiO_3$ or $Na_2TiO_3$ when enough alkali metal hydroxide or carbonate is used for the formation of these compounds. If less of the alkali metal compound is used the product is a mixture of the above with $K_2Ti_2O_5$ or $Na_2Ti_2O_5$, or if a sufficiently small amount of the alkali metal compound is used (see equations) the product is entirely $K_2Ti_2O_5$ or $Na_2Ti_2O_5$.

It is to be understood that the above formulas represent approximately the true compositions, the probability being that the molecules are very complex. If the basic sulphate is used as a starting material, the product always carries a small amount of $K_2SO_4$ or $Na_2SO_4$. In practice it is not necessary to drive off all the water, therefore the product may also carry a small amount of water.

Such alkali metal compound or product is soluble in any number of different acids and mixtures of acids. It may be dissolved direct in the acid, the salt of which it is desired to make; or it may be hydrolyzed with water, some of the alkali metal washed out and the residue is then dissolved in the acid. The following example will disclose how this compound is dissolved in oxalic acid to produce titanium potassium oxalate.

*Example 3.*—About 3200 lbs. of oxalic acid are dissolved in 2000 gallons of water and the temperature brought to about 80° C. The potassium meta-titanate, either dry or in a moist condition, is now slowly added with continuous stirring and the temperature is maintained at about 80° C. There is this immediately formed in solution by double decomposition, titanium potassium oxalate—$K_2OTi(C_2O_4)_2$, which after filtering from the slight amount of insoluble material may be crystallized in any known manner. The potassium sulphate present is not detrimental and is eliminated in the crystallization of the oxalate. The reaction goes according to the following equation:

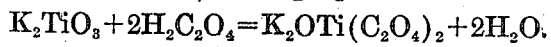

$$K_2TiO_3 + 2H_2C_2O_4 = K_2OTi(C_2O_4)_2 + 2H_2O.$$

The foregoing detailed description gives a clear understanding of my invention but no limitations should be deduced therefrom, as many modifications may be made in such details without departing from the principles of the invention and without sacrificing its advantages.

I claim as my invention:

1. The method of making a titanium compound which comprises mixing hydrated titanium oxygen compounds with an alkaline compound of an alkali metal to form an alkali metal meta titanate, and heating to a temperature below the fusion point.

2. The method of making a titanium compound which comprises mixing hydrated titanium oxygen compounds with an alkaline compound of potassium to form a potassium meta titanate, and heating to a temperature below the fusion point.

3. The method of making a titanium compound which comprises mixing hydrated titanium oxygen compounds containing an acid substance with an alkaline compound of an alkali metal to form an alkali metal meta titanate, and heating to a temperature below the fusion point.

4. The method of making a titanium compound which comprises mixing hydrated titanium oxygen compounds containing an acid substance with an alkaline compound of potassium to form a potassium meta titanate, and heating to a temperature below the fusion point.

5. The method of making a titanium compound which comprises mixing hydrated titanium oxygen compounds containing sulphuric anhydrid with an alkaline compound of an alkali metal to form an alkali metal meta titanate, and heating to a temperature below the fusion point.

6. The method of making a titanium compound which comprises mixing hydrated titanium oxygen compounds containing sulphuric anhydrid with an alkaline compound of potassium to form a potassium meta titanate, and heating to a temperature below the fusion point.

7. As a new article, the hereindescribed titanium compound characterized as being a calcined product, of specific gravity 2.3 to 2.9, in the form of a fine, minutely crystalline powder, slightly hydroscopic, essentially white in color, containing a preponderance of titanic oxide, and soluble in organic and dilute mineral acids.

8. As a new article, the hereindescribed titanium compound characterized as being a calcined product, of specific gravity 2.3 to 2.9, in the form of a fine, minutely crystalline powder, slightly hygroscopic, essentially white in color, containing a preponderance of titanic oxide with a small amount of alkali metal sulphate, and soluble in organic and dilute mineral acids.

LONNIE W. RYAN.